Jan. 2, 1951 R. N. PERKINS 2,536,082
APPARATUS FOR AND METHOD OF TESTING PASTEURIZATION TIME
Filed Sept. 30, 1947 5 Sheets-Sheet 1

INVENTOR
*Ross N. Perkins*
BY
*Blair, Curtis + Hayward*
ATTORNEYS

Jan. 2, 1951 R. N. PERKINS 2,536,082
APPARATUS FOR AND METHOD OF TESTING PASTEURIZATION TIME
Filed Sept. 30, 1947 5 Sheets-Sheet 2

INVENTOR
Ross N. Perkins
BY
Blair, Curtis + Hayward
ATTORNEYS

Jan. 2, 1951  R. N. PERKINS  2,536,082
APPARATUS FOR AND METHOD OF TESTING PASTEURIZATION TIME
Filed Sept. 30, 1947  5 Sheets-Sheet 3

INVENTOR
Ross N. Perkins
BY
Blair, Curtis + Hayward
ATTORNEYS

Jan. 2, 1951 R. N. PERKINS 2,536,082
APPARATUS FOR AND METHOD OF TESTING PASTEURIZATION TIME
Filed Sept. 30, 1947 5 Sheets-Sheet 4

INVENTOR
Ross N. Perkins
BY
Blair, Curtis + Hayward
ATTORNEYS

Patented Jan. 2, 1951

2,536,082

UNITED STATES PATENT OFFICE 2,536,082

APPARATUS FOR AND METHOD OF TESTING PASTEURIZATION TIME

Ross N. Perkins, Brookline, Mass., assignor to The Foxboro Company, Foxboro, Mass., a corporation of Massachusetts Application September 30, 1947, Serial No. 777,070

11 Claims. (Cl. 161—15)

1

The present invention relates to an improvement in apparatus for and method of precision timing of high temperature short time pasteurizers. This application is a continuation-in-part of my application Serial No. 551,721, filed August 29, 1944, now abandoned.

Pasteurization of milk has long been a standard practice commonly required by law. In establishing pasteurization regulations a so-called bacteria death curve has been laid out. This curve is plotted in time against temperature; and various points on the curve indicate different safe pasteurization combinations of time and temperature. One of the points commonly used is that which represents holding the milk above 160° F. for at least fifteen (15) seconds. This is accomplished by passing the milk stream through a stainless steel tube of a definite length, so that when a pump is operated at a given speed, any given portion of the milk stream will take fifteen (15) seconds or over to pass through the holding tube, that is from the time it enters the holding tube at the inlet end until it leaves the holding tube at the outlet end.

Various test procedures for verifying or checking maintenance of the desired time temperature pasteurizing combination have been tried which involve introducing water with or without other substances into the milk-circulating system. These have been objectionable for many reasons among which several will be mentioned. The expense and time required in shutting down and cleaning the equipment and heating the test water or other test medium are out of proportion to the results achieved and tend to discourage frequent testing. Where the results are observed by operators using thermometers and stop watches, the chances for error are considerable. Where the observed results are based on the use of water or other medium in place of milk, the test is faulty because of the differences between milk and the test medium. Known test procedures provide no way by which health inspectors can verify or check the operator's test results without actually repeating the whole test.

An object of the present invention has been therefore, to provide test apparatus and a method whereby any predetermined "holding time" for short time pasteurizing apparatus may be quickly and accurately tested and checked with no interruption to continued pasteurizing operation, with no foreign medium introduced into the milk-circulating system, and with an accurate automatically produced record which can be preserved and relied on both by the processor and by health inspectors.

One embodiment of my invention, so far as it relates to or involves apparatus, is illustrated in the accompanying drawings, wherein—

Figure 1 is a schematic view of portions of conventional short time high temperature milk pasteurizing equipment—but specially equipped with devices for testing the time during which milk in process is maintained at the required pasteurizing temperatures;

Figure 2, a fragmentary enlarged detail showing a portion of conventional recording mechanism and chart included among the devices employed in practicing my testing method;

Figure 1:
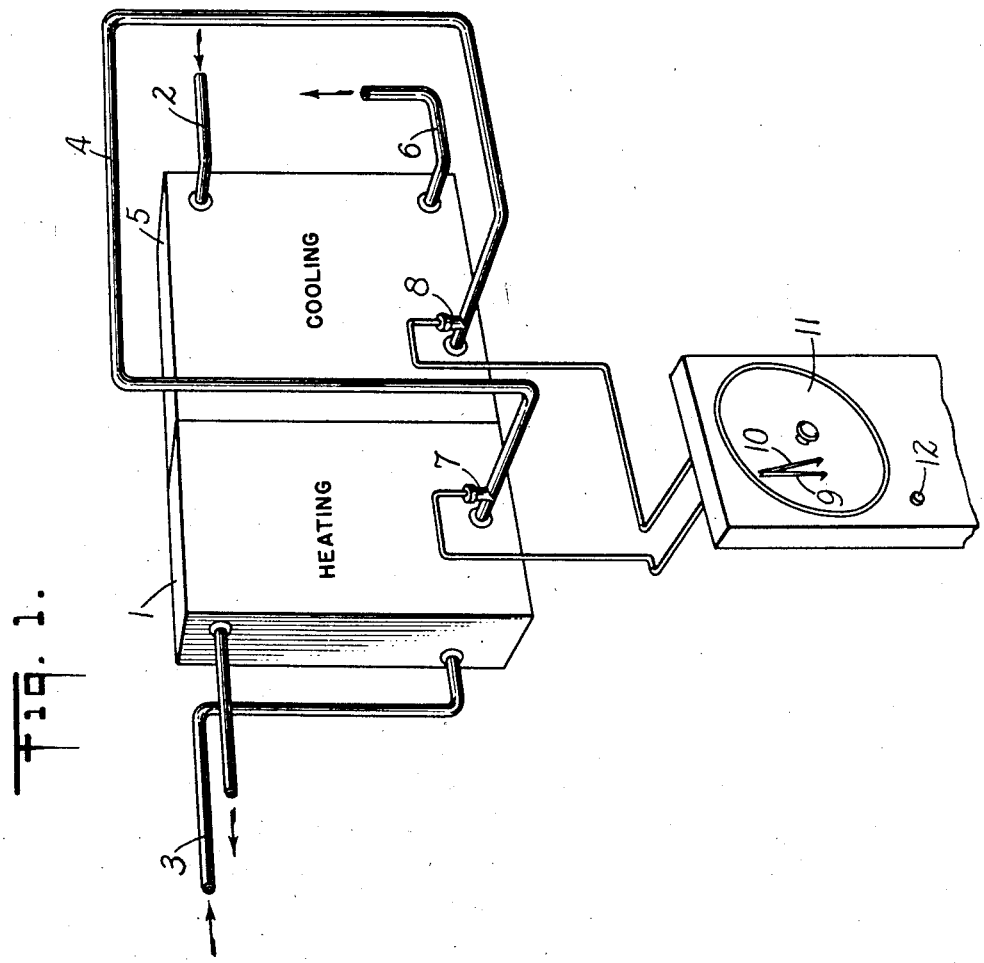

Referring to the drawings, a supply of milk to be pasteurized, as by heating to 160° F., or over for fifteen (15) seconds, is supplied to a heater 1 through a pipe 2. The rate of flow of a stream of milk in said pipe induced by a pump, not shown, may be controlled by any suitable means.

Heating fluid is supplied to heater 1 by pipe 3 and the flow of such fluid and hence the heating effect thereof on the milk is controlled by suitable means.

Connected with the heating means is a holding tube 4 usually of stainless steel and of a definite length so that the milk leaving the heater and entering the tube will take fifteen (15) seconds or more to move from the entry end of the holding tube to its discharge end. The milk passes from the holding tube directly through a cooling zone, as 5, and discharges therefrom through pipe 6.

For the purposes of the present invention, one bulb, as 7, of a known type of two pen vapor pressure recording thermometer is inserted in a portion of tube 4 at its inlet end and the other bulb 8 of said thermometer is inserted at its outlet end. These bulbs 7 and 8 are operatively connected to the pens 9 and 10 respectively, in a well known manner to move said pens in response to variations in temperature affecting said bulbs as described in U. S. patent to C. D. Young, No. 2,209,910, dated July 30, 1940.

Said pens 9 and 10 operate to produce a record track or marking upon a time-temperature indicating record chart 11. Said chart is rotated at a predetermined speed by conventional clock means, not shown, operating in a well known manner and conveniently started and stopped by conventional actuating control devices including a push button 12.

For greater convenience in practicing my testing method, the chart-actuating mechanism is calibrated to rotate chart 11 a full 360° in some predetermined time, as three minutes. Thus, the time-indicating markings 13 may be angularly spaced to represent predetermined time intervals as seconds, half seconds, etc., and the concentric temperature indicating markings 14 may be radially spaced to represent 1° F., or other temperature values.

In testing, the equipment is checked to make certain that it is functioning properly and that the operating temperature conditions are stabilized and in equilibrium, under which condition the temperature of the milk stream leaving the heater and entering the holding tube will be constant. Chart 11 is then caused to rotate by pushing button 12 which starts the chart drive. The stabilized temperature condition of the milk in the heater is then upset, for example, by increasing the supply of steam or other heating fluid to cause the temperature of the milk stream leaving the heater to rise several degrees above regular pasteurizing temperature, three degrees being sufficient for testing purposes.

The rising temperature of the milk, as it flows into the inlet end of holding pipe 4, initially affects bulb 7. The free end of pen 9, controlled by operation of said bulb in a well-known manner, is caused to move outwardly across chart 11 to a new position; and in so doing, it makes an outward mark 15, representing the changing temperature condition, thus visibly recording the time and extent of its movement. When milk at the increasing temperature reaches bulb 8 at the discharge end of holding tube 4, the free end of pen 10 is also caused to move outwardly across chart 11 and makes a visible record, as outward mark 16, of its movement on said chart.

By determining the elapsed time between the starting of said outward movement of pen 9 (line or mark 15) and the starting of said outward movement of pen 10 (line or mark 16), the tester ascertains how long any given portion of the milk stream remains in tube 4 at the then existing temperature.

When the test has been completed, normal operating temperature is restored by reducing the rate of heat supply to heater 1. When the resulting positions of pens 9 and 10, or other indicators, show that the desired pasteurizing conditions have been established, rotation of chart 11 is stopped and the chart may be removed and replaced by a fresh chart for the next test.

Figure 2:
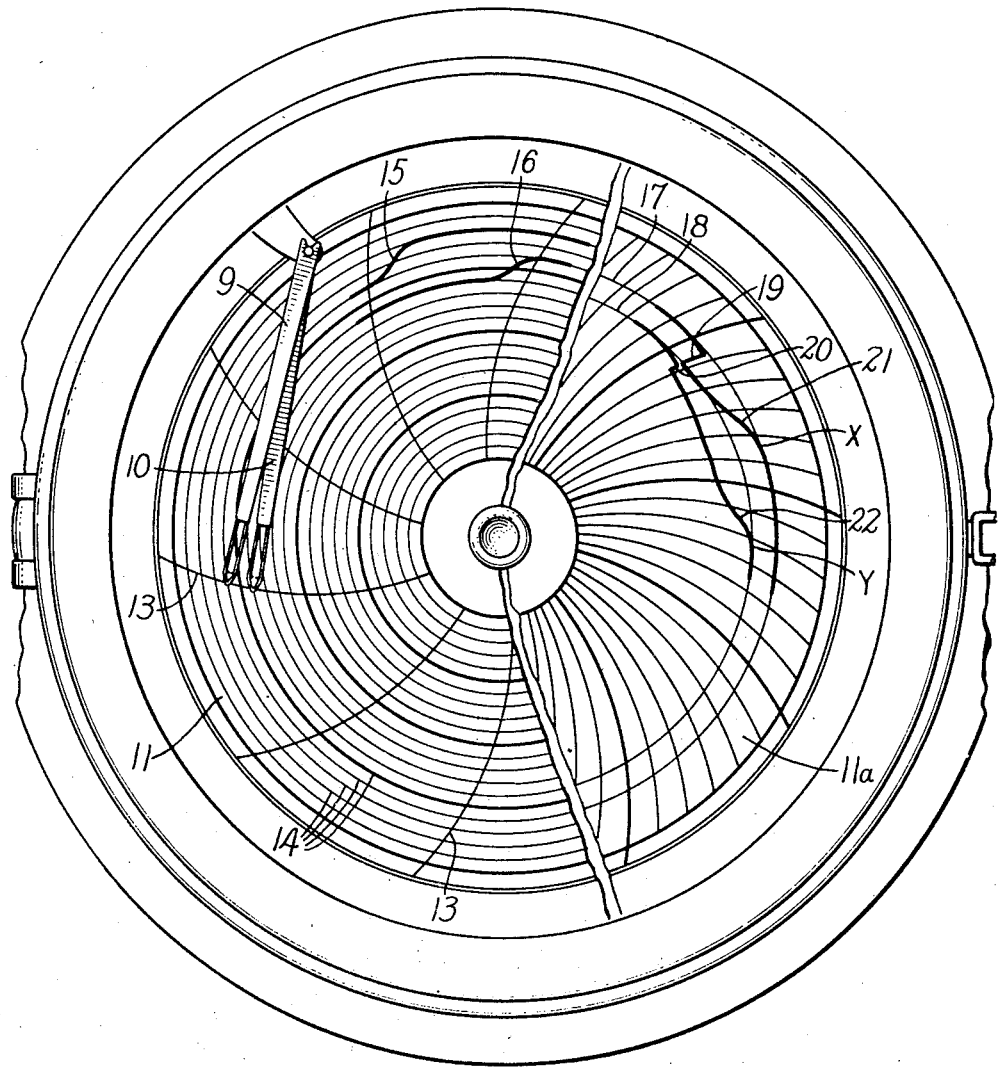

The removed chart provides a record of the test in the form of said markings 15 and 16 thereon by pens 9 and 10 respectively. In the illustrated example, Figure 2, it appears that after pen 9 started to move outwardly in response to the temperature change, both pens traversed a distance representing about sixteen (16) seconds before the free end of pen 10 started to move outwardly. Said chart record therefore indicates that the temperature change at the outlet end of pipe 4 took place more than fifteen (15) seconds after the change at the inlet end of said pipe, thus showing that each portion of the stream of heated milk would be in passage in tube 4 at least the required fifteen (15) seconds for adequate pasteurization.

The foregoing reference to means for varying the rate of milk flow and to means for varying the supply of heating fluid to heater 1, will be understood by those skilled in the art as contemplating the use of effective automatic control devices without which practical results are not obtainable and whereby changes in rates of flow, for example, to produce change of temperature, are effected in general by manually setting the control point of the control mechanism. A control mechanism suitable for the purpose is such as that described in the U. S. patent to C. E. Mason, No. Re. 20,092, dated September 1, 1936.

The method of the present invention may also be carried out utilizing the conclusion of the rise in temperature rather than the start of the rise in temperature as the basis for measuring the time required for the flow through the holding tube. Thus, for example, under steady conditions a chart 11a (with or without temperature divisions), Figure 2, may be mounted on the recorder and turned through 360° with the pens 9 and 10 drawing their respective circles 17, 18 on the chart, the outlet temperature pen 10 being set to draw circle 18 inside that drawn by the inlet recording pen 9, as shown in the right hand section of the chart of Figure 2. Thereafter, and with the chart stopped, the temperature in the heater may be caused to lower, say 3°, by setting down the control point of the controller controlling the temperature of the milk in the heater. During the time that the temperature of the milk is thus reduced, the milk may be recirculated back to the heater by the usual flow diversion valve, not shown. The effect of lowering the temperature is indicated on the chart 11a by the lines 19 and 20, respectively, line 19 being that traced by pen 9 and line 20 that traced by pen 10 when the chart is at rest.

After the conditions have become stabilized at this lower temperature, the control point setting is restored to its previous value; and simultaneously, the clock driving the chart 11a is starter by pressing the button 12. This will cause the temperature at the bulb 7 to increase gradually to its previous value as indicated by line 21 on chart 11a. Subsequently, the temperature at the bulb 8 will increase to its previous value as indicated by line 22 on said chart. By subtracting the time required for the temperature at bulb 7 to reach its original value following the pressing of button 12 from the time required for the temperature at bulb 8 to reach its previous value, the time required for the flow of any given portion of the milk through the pipe 4 is obtained. This time is indicated on chart 11a as the angular distance between intersection X of line 21 with circle 17 and intersection Y of line 22 with circle 18. It will be understood, of course, that the above method may be carried out by causing the temperature to be lowered rather than to be raised.

From the foregoing it is apparent that the record showing the lapse of time between the temperature change of the two bulbs 7 and 8, may be made using one pen instead of using the two pens. To this end the two measuring elements connected to the bulbs 7 and 8 may be connected in the conventional manner to operate differentially a single pen. With this construction when the milk temperature in the holding pipe 4 is in equilibrium (not changing) the record drawn by the single pen is an even line (a circle on the record chart). But when the temperature of the milk in the heater is caused to change or to assume a rate of change as above described, then because the upstream bulb 7 feels any temperature change before the downstream bulb 8 feels the temperature change, the pen is caused to change its position or to assume a rate of change as the case may be. As soon as the changing temperature wave-front reaches the downstream bulb 8, the rate of change that the pen had due to the increasing temperature at bulb 7, is reduced or even stopped, and as the temperature of bulb 8 increases thereby reducing the temperature difference, the pen starts moving back to its normal position.

Under the above operation, if the time required for the temperature of the milk flowing in the heater to reach its new high value, is less than the holding time, then the holding time is obtained by the difference between the time of the starting of the pen away from its normal position and the time of the starting of the pen back to its normal position. But if the time required for the temperature of the milk in the heater to reach its new value is greater than the length of the holding time, then the holding time is obtained by the difference between the time at which the pen started away from its normal position and the time at which the pen started slowing down.

Figure 3:
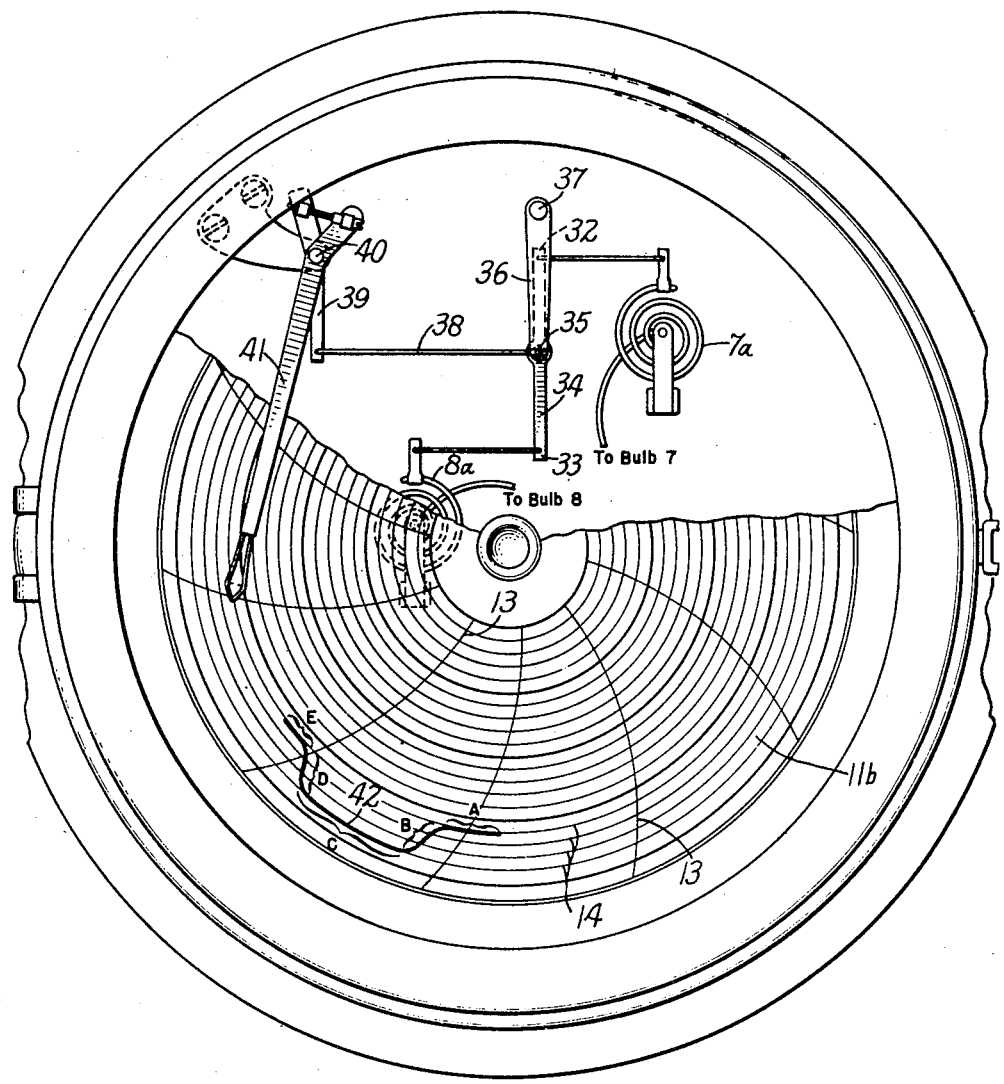
Figure 3 is a front elevation of a novel recording instrument utilizing a single pen and adapted to carry out the method of the invention.

Details of apparatus for carrying out the invention utilizing a single pen are shown in Figure 3. In Figure 3, the temperature bulb 7 is operably connected to a conventional spiral Bourdon element 7a, and temperature bulb 8 is similarly connected to a spiral Bourdon element 8a. The free ends of the Bourdon elements 7a and 8a are, respectively, mechanically connected to ends 32 and 33 of a differential lever 34, pivotally supported about a floating axis 35 from a lever 36, itself freely pivoted about a fixed axis 37.

The elements 7a and 8a are so arranged, as shown in the drawing, that equal increases or decreases of temperature in the bulbs 7 and 8 produce equal but opposite movements of the ends 32 and 33 of lever 34, so that the floating axis 35 of lever 36 is not moved from a neutral position. But movement of the free end of element 7a alone, causes the lever 34 to move effectively about its end 33, and thus causes the axis 35 to move. Similar movements of the element 8a produce similar results. Also, whenever equal temperatures exist at the two bulbs 7 and 8, the elements 7a and 8a will always position the axis 35 at substantially the same neutral point.

The axis 35 is connected by link 38 to a lever 39 pivoted at 40 and mechanically connected to the pen arm 41 in a conventional manner, such for example as described in Young 2,209,910. Movement of the axis 35, therefore, moves pen arm 41. And in operation, an increasing temperature reaching the bulb 7 before it reaches the bulb 8 causes the free end of the element 7a to move counter-clockwise, thereby moving the end 32 of lever 34 to the left, effectively about its end 33, and thereby moving the axis 35 to the left about the fixed pivot 37. This action moves the link 38 to the left, and moves the pen outwardly with respect to the center of the chart.

Referring to the chart of Figure 3 and to the record 42 drawn thereon, section A of the chart is a record drawn by the pen when the temperatures at the bulbs 7 and 8 are steady. The section B of the record 42 has recorded the action of the pen while the temperature in bulb 7 is increasing and before the increasing temperature has reached bulb 8. The section C of record 42 records the action of the pen after the temperature at bulb 7 has stopped increasing and has become constant, and at a value different from that being measured by the bulb 8.

When the increasing temperature reaches bulb 8, the free end of the element 8a moves clockwise and to the right, thereby moving the end 33 of lever 34 to the right effectively about its end 32, and thereby moves the axis 35 and the lever 36 back toward their normal position. This action starts moving the pen back toward its original position assumed when steady temperatures are measured by the bulbs 7 and 8.

The section D of record 42 records the action of the pen during the time that the bulb 8 is increasing in temperature.

When the temperature measured by bulb 8 reaches its final value equal to that measured by bulb 7, the pen stops moving and draws a record such as shown in section E of record 42.

Assuming, as hereinbefore discussed, that a temperature increase is caused to take place in the milk within the heater, the record 42 on chart 11b records behavior of the bulbs 7 and 8 in response to the increased temperature of the milk stream. And from record 42 the holding time may be determined, because the beginning of section B of record 42 shows when the temperature increase reached bulb 7, and the beginning of section D of record 42 shows when the temperature increase reached bulb 8. Therefore, the lapse of time between the beginning of section B and the beginning of section D is a measure of the holding time of the holding tube 4 of Figure 1.

In normal milk pasteurizing operation the length of the holding time is much longer than the time required for the imposed temperature increase in the heater to come to equilibrium (i. e., the time required for the temperature change indicated by section B on the chart of Figure 3). Thus, by the time the imposed temperature increase in the milk stream reaches the downstream bulb 8, the temperature of the upstream bulb 7 has reached equilibrium, and the straight-line section C is recorded on the chart.

If, however, the operation is such that the time required for the imposed temperature change in the heater to reach equilibrium is longer than the holding time so that the temperature of the upstream bulb 7 is still changing when the temperature change reaches the downstream bulb 8 (an operating condition that would record no straight-line section C on the chart of Figure 3), then the effect of the imposed temperature change reaching downstream bulb 8 is to produce an abnormal fluctuation in the record 42 on the chart, which fluctuation may take the form of either an abrupt flattening of the record in section B, or an abrupt reversal of the record 42 to make it slope toward the starting record of section A. In this event, the holding time is measured from the start of section B to the abrupt change in record 42.

Because the rate of movement of helix 7a under the influence of the changing temperature of upstream bulb 7, in slowing down while coming to equilibrium, cannot parallel that of the movement of helix 8a under the influence of downstream bulb 8 in starting to change, overlapping of the imposed temperature change over both bulbs 7 and 8 will always record an unusual and abrupt fluctuation of the record 42 even though the temperature change in the heater is accomplished so slowly that it does not balance out within the holding time. This abrupt and unusual fluctuation, which is not charactertistic of the behavior of the record produced by helix 7a moving alone, is an indication of the temperature change reaching bulb 8 and so marks a time boundary of the holding time.

Figure 4:
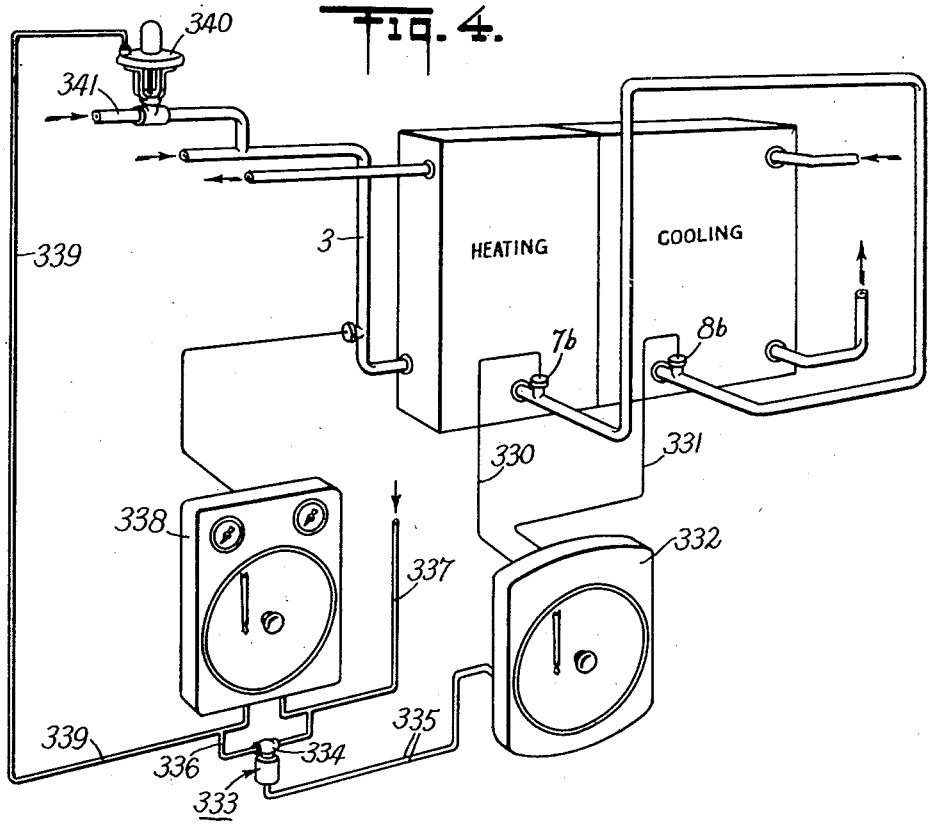
Figure 4 is a schematic view of the milk pasteurizer of Figure 1 but showing novel single pen recording instrument for recording the holding time and including an automatically operated mechanism for initiating the temperature change utilized in the milk stream to carry out the method of the invention.

Referring to Fig. 4, another mechanism is shown for carrying out the method of the invention. In this embodiment, upstream temperature responsive bulb 7b and downstream temperature responsive bulb 8b are resistance thermometers. By suitable cables 330 and 331 the bulbs are electrically connected to the recording instrument generally indicated at 332. This instrument is so set up that its pen 318 can record at one time the temperature of only one of the bulbs, i. e. the instrument is connected either to upstream bulb 7b or to downstream bulb 8b. As will be explained, bulb 8b is normally connected with the recording instrument. The switching from bulb 8b to bulb 7b may be accomplished by holding a suitable switch button depressed. When the switch is thus depressed it simultaneously sets in operation a timing mechanism which closes a switch and energizes a solenoid 333 which opens a valve 334 to induce a heat wave in the milk stream passing through the holding tube. The solenoid is connected by wire leads 335 to the switch operated by the timing mechanism.

Valve 334 normally closes a pipe 336 which connects an air supply pipe 337, supplying air to a conventional proportioning-plus-reset controller 338, with the output air pressure pipe 339 from controller 338. Controller 338 controls the temperature in a hot water intake pipe 3 which heats the milk going to the holding tube. The control is accomplished by the air pressure from controller 338 operating a diaphragm motor and valve 340 which controls the admission of steam from pipe 341 to the hot water intake pipe 3.

With this mechanism, when the switch button is depressed switching the recording mechanism to upstream bulb 7b, the timing mechanism automatically causes the solenoid valve 333 to open for a definite but limited period of time to supply full air pressure to diaphragm motor and valve 340, thereby to supply to the hot water in pipe 3 an amount of steam sufficient to cause the temperature of the milk in the heating tank to be raised. The timing mechanism is preferably set so that the excess steam supply will produce a satisfactory heat wave in the milk stream.

Figure 5:
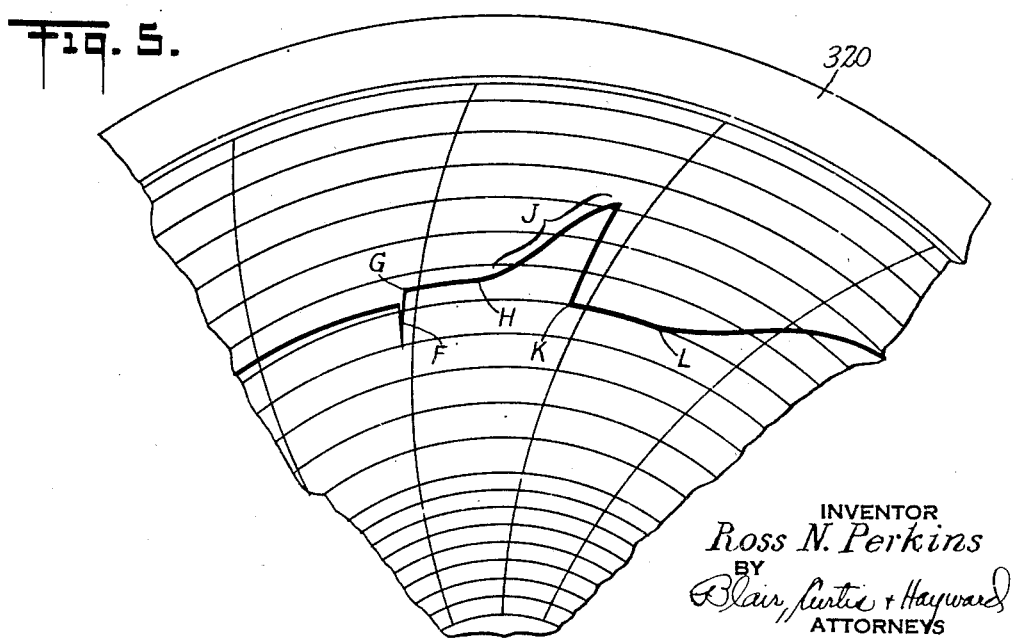
Figure 5 shows on a section of chart the holding time record recorded by the recorder of Figure 4.

When the switch is depressed thus to connect upstream bulb 7b with the recorder and simultaneously to produce the heat wave, the recorder records on the chart a dip marked F in Fig. 5. Point G in Fig. 5 marks the start of the recording of the temperature of upstream bulb 7b. The switch is held depressed until the temperature wave reaches bulb 7b, which time is indicated by the temperature of bulb 7b starting to rise. The point marked H on the chart shows the time at which this temperature rise started to occur. The operator then continues to hold the switch button depressed until an adequate record of the rise is obtained as indicated by the section J on the chart, at which time he releases the switch button and this automatically disconnects bulb 7b and connects downstream bulb 8b with the recording mechanism. The chart Fig. 5 shows the operation at point K. When the temperature rise of the milk reaches the downstream bulb 8b, the pen 318 will record the temperature rise and point L on the chart shows when this temperature rise commenced. The time lapse between the points H and L is a measure of the time that it takes for an increment of the milk to pass through the holding tube, and so is a measure of the holding time of the pasteurizer.

Figure 6:
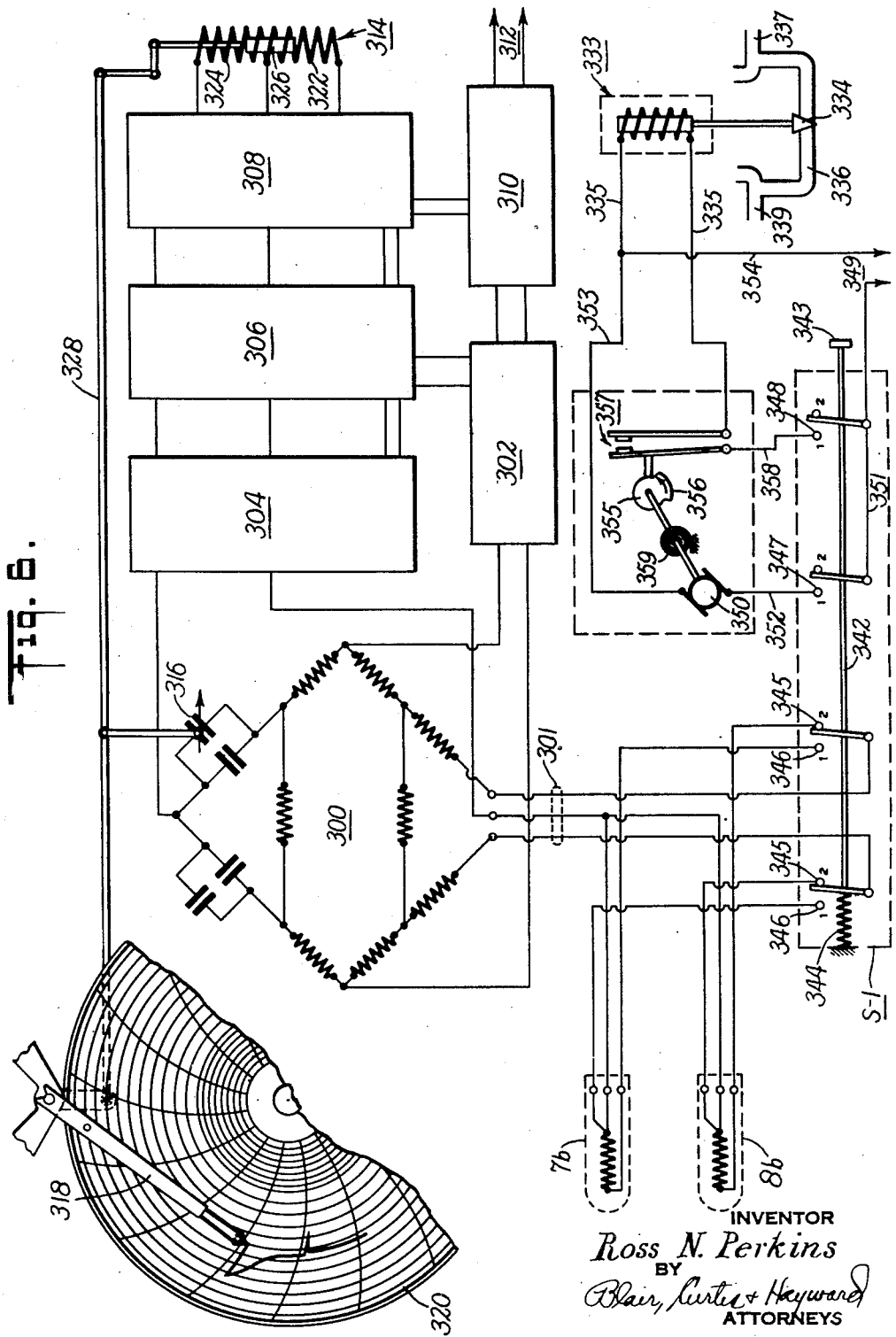
Figure 6 shows diagrammatically the circuits and mechanism of the recorder of Figure 4.

The details of the temperature recording instrument of Fig. 4 are shown in Fig. 6. It is an automatically self-balancing measuring and recording instrument of the type described in the article entitled "Strain Gages" by D. M. Nielsen in Electronics, December 1943. It includes a modified Wheatstone bridge resistance-measuring circuit, generally indicated at 300, to which either of the resistance thermometer bulbs 7b or 8b may be connected through a switching mechanism S—1 (hereinafter to be described), and a three conductor cable 301. A suitable source of A. C. potential, generally indicated at 302. such as a vacuum tube oscillator, is provided for energizing this bridge circuit at some suitable frequency, such as 1,000 cycles per second. The bridge output voltage is applied, through a voltage amplifier circuit, generally indicated at 304, to a phase discriminating and balance control circuit, generally indicated at 306, and a power amplifier, generally indicated at 308. A power supply, generally indicated at 310, connected to some suitable power supply lines 312, is provided for supplying operating potentials to these various elements of the instrument. The output of the power amplifier 308 is applied to a balancing motor, generally indicated at 314, which adjusts the balancing bridge 300 by means of a variable condenser 316 to tend to rebalance it and at the same time drive a recording pen, shown schematically at 318, over a chart, shown partially at 320, to make a record of the changing temperatures being measured.

In the operation of this automatic temperature measuring and recording mechanism, when a change occurs in the temperature of the temperature bulb connected to the recorder, an unbalance voltage is produced across the output of the bridge which is substantially proportional to the magnitude of the temperature change and of phase dependent upon the direction of the change. This unbalance voltage is amplified by the voltage amplifier 304, and is impressed on the phase discriminating and balance control circuit 306. This phase discriminator circuit recognizes the phase of the unbalance voltage by comparing it with a voltage fed directly thereto from the oscillator 302 and develops a D. C. bias potential of magnitude and polarity proportional to the extent and direction of the unbalance of the measuring bridge circuit 300. This D. C. bias potential is applied to the power amplifier circuit 308 wherein it is amplified and applied to the balancing motor 314. In the present embodiment of this instrument, this balancing motor is a reciprocating magnetic motor consisting of a pair of solenoid coils 322 and 324 surrounding a cylindrical magnetic core 326 which is connected by a rigid driving linkage, generally indicated at 328, to the rotor of the balancing capacitor 316 and to the recording pen 318. This motor 314 is so designed that the magnetic force exerted by the coils 322 and 324 on the moving core 326 is practically independent of the core position and is a function only of the currents in the two coils. Under the condition of bridge balance, i. e. when the unbalance voltage is zero, equal direct currents flow in the two motor coils and the balancing capacitor 316 is held at the correct position in which the pen 318 indicates the temperature being measured. As soon as a temperature change occurs, thus producing bridge unbalance, this unbalances the two motor coil currents and drives the core, and thus the rotor of the balancing capacitor, to the correct new balance position.

The balancing action of the recorder is rapid, and may be made such that the pen 318 is caused to traverse the chart in as short a time as one second. Also the instrument may be made so sensitive that a degree of temperature change in the temperature responsive bulb produces a large pen movement.

Still referring to Figure 6, the mechanism for switching the recording mechanism from bulb 8b to bulb 7b and vice versa will now be described.

A switch operating lever 342 operated by a switch button 343 is normally urged to the right by a spring 344 so that through switch contacts 345 cable leads 301 are connected to corresponding leads of bulb 8b. But when the button 343 is depressed, switch contacts 346 connect leads of cable 301 to corresponding leads of bulb 7b. When the switch button 343 is released, spring 344 automatically disconnects bulb 7b and connects bulb 8b with the recording instrument.

Referring now to the timing mechanism by which the heat wave is automatically produced in the milk stream; when switch button 343 is in its normal rightward position, switch contacts 347 and 348 are open and power supply, from a suitable source of power 349, is supplied neither to the timing mechanism nor to the solenoid valve 333. But when button 343 is depressed contact 347 is completed to supply power to a small motor 350 of a conventional timing mechanism. The power is supplied through lead 351, switch contact 347, lead 352, lead 353 and lead 354.

Motor 350 serves to turn a cam 355 and to cause its lobe 356 to close switch 357 and to hold it closed for the period of time that it takes lobe 356 to move past the switch operating projection. In practice the switch 357 may be held closed for a period of five seconds. This is accomplished by selecting the speed of the motor 350 and by the length of the lobe 356. When switch 357 closes solenoid 333 is energized by power supplied through switch contact 348, through lead 358, through switch 357, through lead 335 and lead 354.

When switch button 343 is released, and the power is disconnected from motor 350, a coiled spring 359 returns cam 355 to its starting position shown in Fig. 6. Because switch contact 348 is open at the time cam 335 returns to its starting position, the reclosing of switch 357 by lobe 356 when the cam 355 returns to its starting position does not energize the solenoid 333.

In operation it is necessary for the operator to hold switch button 343 depressed until pen 318 records a rise of temperature on the chart, but it is not necessary to hold it depressed until the full temperature rise of upstream bulb 7b occurs.

The Fig. 4 embodiment has among others the following advantage: It produces a record which is readily readable to ascertain the time at which the temperatures of bulbs 7 and 8 start to rise due to the heat wave induced by the excessive supply of steam. The dip F in the record definitely marks the beginning of the start of a measuring operation. The dip from the top of section J to point K marks with definiteness the time when the recorder was switched to downstream bulb 8b. It is therefore comparatively easy for the operator to pick out the points H and L which indicate the respective times at which the heat wave reached the respective upstream and downstream temperature responsive bulbs.

As many possible embodiments may be made of the above invention, and as many changes may be made in the embodiment above set forth, it is to be understood that all matter hereinbefore set forth or shown in the accompanying drawings is to be interpreted as illustrative and not in a limiting sense.

I claim:

1. Pasteurizing apparatus wherein a continuous flow of milk is heated by heating means and is then flowed through a holding tube wherein heat flow to or from the milk is prevented, the combination of apparatus for testing the time of passage of milk through the holding tube comprising a two pen recording thermometer, said thermometer having a temperature sensitive bulb located at an upstream portion of said holding tube and operatively connected to one of said pens, and a second temperature sensitive bulb located at a down-stream portion of said holding tube and operatively connected to the other of said pens, a rotatable chart operatively positioned in relation to said pens, whereby said pens and chart cooperate to detect and record the time at which temperature change in said milk stream induced by said heating means reaches the upstream temperature sensitive bulb and the time at which said temperature change reaches the downward stream temperature sensitive bulb, the lapse of time between said two detections being the holding time between said two temperature sensitive bulbs.

2. The method of testing the holding time of milk in continuous flow milk pasteurizing apparatus wherein heat is supplied to a constant flowing stream of milk to heat the successive portions of the milk stream to a predetermined temperature and thereafter the heated milk stream is caused to pass through a holding tube in which heat is neither supplied to nor removed from the milk stream, the steps of bringing about a temperature equilibrium of the milk stream, subsequently upsetting the temperature equilibrium by changing the heat supply to cause the temperature of the flowing stream to start changing toward a new condition of temperature equilibrium, detecting and recording the time at which the temperature of the stream entering said holding tube changes as a result of said upset, detecting and recording the time at which the corresponding change in temperature reaches the outlet of said holding tube, and measuring from said recording the lapse of time between said two detections to obtain the holding time of the milk stream in the holding tube.

3. Method of testing the time of passage of milk in the holding tube of pasteurizing apparatus wherein the milk stream is heated to a predetermined pasteurizing temperature by heating means and is advanced at a constant flow through said holding tube by feeding means, which includes the steps of changing the heat supply to the milk stream to increase the temperature of the milk stream above said predetermined pasteurizing temperature, noting from a temperature measuring device responsive to the temperature of the milk stream in the proximity of the entrance of said holding tube the time at which the portion of the milk stream having the increased temperature begins entering said tube, noting from a temperature measuring device responsive to the temperature of the milk stream in the proximity of the outlet of said holding tube the time at which said portion of the milk stream begins leaving said tube, and calculating therefrom the lapsed time between the time of entrance and leaving.

4. Method of testing the time of passage of milk in the holding tube or pasteurizing apparatus wherein the milk stream is heated to a predetermined pasteurizing temperature by heating means and is advanced through said holding tube by feeding means, which includes the steps of changing the heat balance of the milk stream to increase the temperature of the milk stream above said predetermined pasteurizing temperature, detecting by a temperature responsive device located at the entrance of said tube the time at which the portion of the milk stream having the increased temperature begins entering said tube and making a visible record of said detection on a time chart, and detecting by a temperature responsive device located at the outlet of said tube the time at which said portion of the milk stream begins leaving said tube, and making a visible record of said detection on said time chart, and calculating from the record on said time chart the time that transpired between the beginning of the entrance and the beginning of the exit of said portions of the milk stream.

5. The method of testing the holding time of milk in a continuous-flow milk pasteurizing apparatus in which the milk flows at a constant rate through a heat exchange section which heats the flowing milk so that milk leaving the heat exchange section is at a predetermined temperature, and in which the flowing milk upon leaving the heat exchange section enters and passes through a holding tube in which heat is neither supplied to nor removed from the milk flowing therethrough so that milk leaving the outlet of the holding tube is at substantially the same temperature at which it entered the holding tube, said method including the steps of causing the temperature of the flowing milk before entering said holding tube to change from said predetermined temperature, detecting the time at which the flowing milk having the changed temperature begins entering said holding tube, detecting the time at which the flowing milk having the changed temperature begins leaving said holding tube, and measuring the lapse of time between said two detections to obtain the holding time of the milk stream in the holding tube.

6. For use in connection with pasteurizing apparatus in which a continuous flow of milk is heated in heat exchange apparatus and is then caused to pass through a holding tube wherein heat flow to or from the milk stream is prevented, the combination of apparatus for measuring the time of passage of a portion of the milk stream through the holding tube comprising, a recording thermometer having a movable chart and a pen movable over said chart, an upstream temperature responsive device associated with said recording thermometer responsive to the temperature of the milk stream in the upstream portion of said holding tube, a downstream temperature responsive device associated with said recording thermometer responsive to the temperature of the milk stream in the downstream portion of said holding tube, a differential connection connecting said temperature responsive devices, a drive connecting said differential connection and said pen whereby said pen is positioned in accordance with the difference between said temperature-responsive devices, and said pen and chart cooperate to detect and record the time at which temperature change introduced by said heating means reaches the upstream temperature responsive device, and the time at which said temperature change reaches the downstream temperature responsive device, the lapse of time between said two detections on said chart being the holding time of the milk stream flowing between said two temperature responsive devices.

7. For use in connection with pasteurizing apparatus in which a continuous flow of milk is heated in heat exchange apparatus and is then caused to pass through a holding tube wherein heat flow to or from the milk stream is prevented, the combination of apparatus for measuring the time of passage of a portion of the milk stream through the holding tube comprising, a recording thermometer having a movable chart and recording means movable over said chart, an upstream temperature responsive device associated with said recording thermometer responsive to the temperature of the milk stream in the upstream portion of said holding tube, a downstream temperature responsive device associated with said recording thermometer responsive to the temperature of the milk stream in the downstream portion of said holding tube, a connection between said temperature responsive devices and said recording means to operate said recording means in accordance with the temperatures of the upstream and downstream portions of the holding tube whereby said recording means and chart cooperate to detect and record the time at which the temperature change introduced by said heating means reaches the upstream temperature responsive device and the time at which said temperature change reaches the downstream temperature responsive device, the lapse of time between said two detections on said chart being the holding time of the milk stream flowing between said two temperature responsive devices.

8. The method of measuring the time required for liquid at constant temperature to pass from one location to another in a conduit, which consists of momentarily introducing at said first location a liquid charge of different temperature, detecting the time of passage of said charge at said first location and at said second location, and calculating the lapse of time between said two detections.

9. Apparatus for use in a liquid treating process wherein the liquid being treated is normally continuously passed through a conduit holding section for the purpose of maintaining the temperature of the liquid between predetermined temperature limits while in such section for not less than a given length of time, means for recording the temperature of the liquid as it passes into and out of said holding section and the time required for a given portion of the liquid to pass through said holding section, comprising a two styli temperature recorder provided with a circular recording chart, means responsive to the temperature entering the holding section for operating one of the styli, means responsive to the temperature flowing out of the holding section for operating the other stylus, and a timing motor for rotating the chart at a constant known rate, the two temperature recording systems having similar rates of response so that temperature records made thereby on the chart may be accurately time coordinated, the recording positions of the two styli along the chart and the rate of rotation of the chart relative to the desired holding time being such that the time interval between the entering and outgoing liquid temperature records of the same portion of the liquid passing through the holding section at or near the normal desired rate can be accurately and readily ascertained from the chart record.

10. In an arrangement for measuring the duration of the heating and cooling period of a liquid being treated at a predetermined temperature in a treating device, the combination with said device including a passageway and means for advancing the liquid through said passageway at a uniform rate, of a first element responsive to a change in temperature of the liquid at one point in said passageway adjacent the inlet thereof, a second element responsive to change in the temperature of the liquid at a second point in said passageway adjacent the outlet thereof and spaced from said first point, and means for indicating the duration of the interval between the responses of said elements.

11. In an arrangement for measuring the duration of the heating or cooling period of a liquid being treated at a predetermined temperature in a treating device, the combination with said device including a passageway and means for advancing the liquid through said passageway at a uniform rate, of a first element responsive to a change in temperature of the liquid at one point in said passageway adjacent the inlet thereof, a second element responsive to a change in temperature of the liquid at a second point in said passageway adjacent the outlet thereof, and spaced a predetermined distance from said first point, and means jointly responsive to said elements for exhibiting the lapsed time measurement between the temperature responses thereof.

ROSS N. PERKINS.

REFERENCES CITED

The following references are of record in the file of this patent:

UNITED STATES PATENTS

| Number | Name | Date |
| --- | --- | --- |
| 759,306 | Peck | May 10, 1904 |
| 1,156,503 | Sheldon | Oct. 12, 1915 |
| 1,245,688 | Crewson | Nov. 6, 1917 |
| 1,349,409 | Crawford | Aug. 10, 1920 |
| 1,525,463 | Packard | Feb. 10, 1925 |
| 1,614,702 | Wilson | Jan. 18, 1927 |
| 1,616,481 | Allen | Feb. 8, 1927 |
| 1,624,572 | Bagby | Apr. 12, 1927 |
| 1,624,573 | Bagby | Apr. 12, 1927 |
| 2,038,511 | Kortlandt | Apr. 21, 1936 |
| 2,256,904 | Kintner | Sept. 23, 1941 |
| 2,353,382 | Barrett | July 11, 1944 |
| 2,356,607 | O'Brien | Aug. 22, 1944 |

FOREIGN PATENTS

| Number | Country | Date |
| --- | --- | --- |
| 2,400 | Great Britain | 1878 |
| 456,131 | Great Britain | Nov. 3, 1936 |